United States Patent [19]

Astley et al.

[11] Patent Number: 4,710,366

[45] Date of Patent: Dec. 1, 1987

[54] METHOD FOR PRODUCING STABILIZED WET PROCESS PHOSPHORIC ACID WITH LOW CONTENT OF MAGNESIUM AND ALUMINUM

[75] Inventors: Vivian C. Astley, New Orleans; Jody J. Taravella, Harvey, both of La.

[73] Assignee: Freeport Minerals Company, New Orleans, La.

[21] Appl. No.: 922,420

[22] Filed: Oct. 23, 1986

[51] Int. Cl.⁴ .................................................. C01B 25/6
[52] U.S. Cl. ............................. 423/321 R; 423/158; 423/472
[58] Field of Search ................. 423/321 R, 321 S, 320, 423/158, 472

[56] References Cited

U.S. PATENT DOCUMENTS

| | | | |
|---|---|---|---|
| 2,954,287 | 9/1960 | Carothers et al. | 71/40 |
| 3,408,162 | 10/1968 | Satterwhite et al. | 23/165 |
| 3,494,736 | 2/1970 | Carothers et al. | 23/165 |
| 3,512,927 | 5/1970 | Betts | 23/88 |
| 3,554,694 | 1/1971 | Barker et al. | 23/88 |
| 3,562,769 | 2/1971 | Sugahara et al. | 23/165 |
| 3,642,439 | 2/1972 | Moore et al. | 23/165 |
| 3,819,810 | 6/1974 | Goldstein | 423/321 R |
| 3,843,767 | 10/1974 | Faust et al. | 423/167 |
| 3,935,298 | 1/1976 | Sugahara et al. | 423/320 |
| 4,110,422 | 8/1978 | Hill | 423/317 |
| 4,136,199 | 1/1979 | Mills | 423/321 R |
| 4,164,550 | 8/1979 | Hill | 423/321 R |
| 4,248,843 | 2/1981 | Williams et al. | 423/321 R |
| 4,248,846 | 3/1981 | Hill | 423/317 |
| 4,279,877 | 7/1981 | Hill et al. | 423/321 R |
| 4,293,311 | 10/1981 | Hill | 23/301 |
| 4,299,804 | 11/1981 | Parks et al. | 423/321 R |
| 4,305,915 | 12/1981 | Hill | 423/321 R |
| 4,364,912 | 12/1982 | Hill | 423/321 R |
| 4,435,372 | 3/1984 | Frazier et al. | 423/321 R |
| 4,487,750 | 12/1984 | Astley et al. | 423/321 R |

FOREIGN PATENT DOCUMENTS 2046295 9/1970 Fed. Rep. of Germany .

Primary Examiner—Gregory A. Heller
Attorney, Agent, or Firm—Fisher, Christen & Sabol

[57] ABSTRACT

Wet process phosphoric acid, stabilized with respect to the precipitation of solids upon aging, and containing significantly reduced levels of magnesium and aluminum, is prepared by the controlled addition of fluosilicic acid to wet process filter grade phosphoric acid followed by a series of evaporation, crystallization and centrifugation steps. Sufficient fluosilicic acid is added to provide a fluorine to magnesium ratio of about 2.5:1 to 10.1:1, preferably 5:1. The final product, which has a $P_2O_5$ content of at least 56 percent, contains low amounts of magnesium and aluminum, and exhibits low solids precipitation characteristics during shipment, storage and eventual processing into end products such a fertilizers.

20 Claims, 1 Drawing Figure

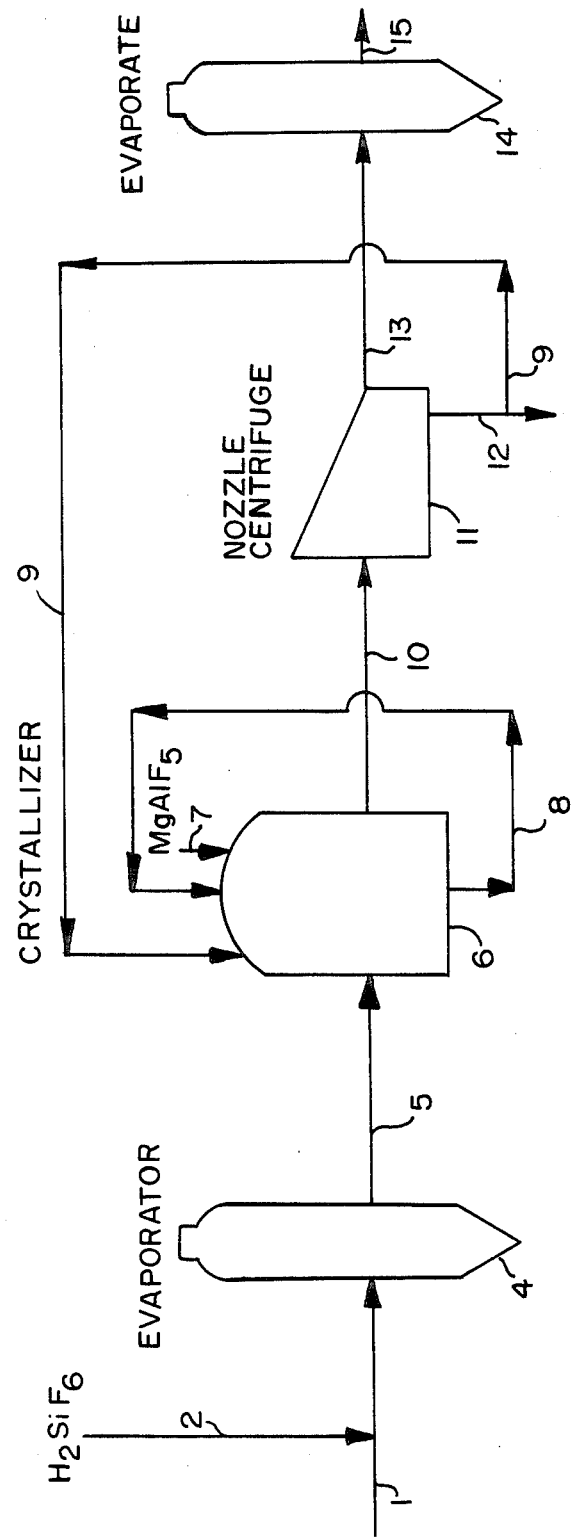

METHOD FOR PRODUCING STABILIZED WET PROCESS PHOSPHORIC ACID WITH LOW CONTENT OF MAGNESIUM AND ALUMINUM

BACKGROUND OF THE INVENTION

1. Field of the Invention

The invention relates to methods for producing, purifying and recovering orthophosphoric acid. More particularly, the invention relates to improved methods for producing stabilized wet process phosphoric acid having significantly reduced levels of magnesium and aluminum.

2. Description of the Prior Art

Phosphoric acid is a versatile chemical finding its way into diverse industries. The fertilizer industry neutralizes phosphoric acid with ammonia to provide a rich source of nitrogen and phosphorous readily assimilable by food crops. Nitrogen and phosphorous have many nutritional values, the most notable perhaps being as structural components of nucleic acids. Accordingly, providing an adequate supply of nitrogen and phosphorous to food crops insures cell multiplication and thus, growth.

It is essential that the fertilizer not have any appreciable amounts of precipitatable metal contaminants which when precipitated present sludge problems. When taken up in food plants the presence of the metal contaminants may be undesirable. Raw phosphoric acid contains metal contaminants such as magnesium and aluminum in substantial amounts.

Most phosphoric acid produced in the United States is produced by the wet process. In this process finely ground phosphate rock is slurried with sulfuric acid and recycled dilute phosphoric acid. The products produced by the chemical reaction between the phosphate rock and sulfuric acid are orthophosphoric acid (commonly known in the industry as phosphoric acid, or more particularly, as wet process phosphoric acid), gypsum, and numerous other suspended and dissolved impurities. The slurry produced is filtered to remove solid impurities, of which gypsum is the major constituent. The resulting filtrate usually contains between about 25 and 35% by weight $P_2O_5$, and between about 1 and 8% by weight suspended solids or impurities that are not removed by filtering. This dilute wet process acid is usually concentrated in multiple stage evaporators to about 52–54% $P_2O_5$ prior to storage and eventual shipment.

The problems encountered in the industry with the impurities produced by the phosphate rock-sulfuric acid chemical reaction are well-known. One major problem encountered is that the impurities not removed by filtration settle out during processing, storage and shipment to form a hard voluminous sludge. This sludge formation is known in the industry as post precipitation. The sludge is difficult and costly to remove and, additionally, represents substantial losses of $P_2O_5$ values. One of the major constituents of the sludge is the complex salt $(Al, Fe)_3KH_{14}(PO_4)_8 \cdot 4H_2O$. Concentrating the acid to more desirable $P_2O_5$ levels compounds the post-precipitation problem. When the wet process phosphoric acid is neutralized with ammonia, magnesium-containing solids precipitate out of solution clogging the transfer and distribution equipment, reducing $P_2O_5$ values and hindering the removal of other types of impurities.

Magnesium and aluminum are two particularly unpleasant impurities present in wet process phosphoric acid. Most magnesium and aluminum present in phosphate rock is dissolved either during the reaction of the phosphate rock with sulfuric acid, or during the filter wash cycle. Once in the acid, the two impurities have proven very troublesome and difficult to remove. Both impurities have unfavorable effects on acid viscosity. The detrimental effect of magnesium on deposit formation during ammonia neutralization steps was previously discussed.

Offsetting these problems is the fact that phosphoric acid is an excellent phosphate donator and the wet process is an economically feasible method for obtaining phosphoric acid. Accordingly, a substantial amount of technology has been generated to solve the numerous problems associated with cleaning up wet process phosphoric acid.

A number of processes have been employed to reduce post precipitation in wet process phosphoric acid. Settling is often employed to reduce the sludge content of the acid prior to shipment. Settling, however, does not resolve the post precipitate problem easily or economically because of the lengthy time required and, also, because acids clarified solely by settling, may still exhibit post precipitation tendencies later on. Purification schemes such as chemical precipitation, solvent extraction and chromatographic ionic exchange methods are not amenable to large scale industrial production.

Stabilization of wet process phosphoric acid is one of the strategies used to clean up wet process phosphoric acid. Examples of stabilization strategies can be found in the U. S. patents issued to Richard Hill. They are U.S. Pat. Nos. 4,110,422; 4,164,550; 4,248,846; 4,279,877; 4,293,311; 4,305,915 and 4,364,912.

U.S. Pat. Nos. 4,110,422 and 4,164,550 to Hill describe a process in which a stabilized wet process phosphoric acid is produced by addition of an aluminum silicate material such as perlite to clarify dilute phosphoric acid, concentrating the acid, transferring it to a crystallization zone where additional clarification occurs, and then further concentrating the acid. This process is not directed toward reducing the magnesium and aluminum content of the acid and may leave high concentrations of the two metals in the acid product.

U.S. Pat. No. 4,248,846 further incorporates a recycle stream from the crystallizer underflow to the acid train and provides for the addition of sulfuric acid to the evaporators when processing rock high in iron and aluminum and for the cooling of one or more streams of the process. This process produces acids which may also be high in aluminum and magnesium.

U.S. Pat. No. 4,279,877 provides a process for high-iron feed acid in which some of the iron is present in the ferrous form and teaches the use of an oxidant such as hydrogen peroxide to oxidize all ferrous iron to the ferric state. The treatment reduces post-precipitation of the final product acid; but, the final product may still be high in magnesium and aluminum.

U.S. Pat. No. 4,293,311 also modifies the process of Hill U.S. Pat. No. 4,110,422 by incorporation of a crystallizer underflow recycle stream to the aluminum silicate addition vessel. Aluminum silicate is still required and this process produces acids which may still be high in magnesium and aluminum.

U.S. Pat. No. 4,305,915 teaches a process similar to those described above and is directed to reduction of post-precipitation tendencies. This particular process requires the addition of perlite or chemicals such as aluminum silicate. Acid products high in magnesium and aluminum may still be produced.

U.S. Patent No. 4,364,912 teaches the production of a stabilized acid without the use of aluminum silicate by prescribing a $Fe_2O_3$-to-$P_2O_5$ weight ratio lower than 0.03 in the feed acid with all the other steps of the process of the Hill U.S. Pat. No. 4,110,422 unchanged. The final product may still have high concentrations of magnesium and aluminum.

More selective chemical purification schemes are known. U.S. Pat. No. 2,954,287 to Carothers et al teaches the purification of wet process acid by the addition of an alkali salt to the sulfuric acid used to attack the phosphate rock. Impurities are advantageously precipitated, it is taught. However, the process of this patent is directed to removing iron, aluminum and fluorine and not magnesium.

U.S. Pat. No. 3,408,162 to Satterwhite et al teaches the prevention of post precipitations by adding a lignosulfonate to the wet process acid. The process, it is taught, keeps impurities solubilized which would otherwise spontaneously precipitate out of solution. The end product may be highly impure and may contain high amounts of magnesium and aluminum.

U.S. Pat. No. 3,512,927 to Betts is directed to recovering fluosilicates from the wet process phosphoric acid and converting the fluorine in the fluosilicates to a soluble fluoride form and recovering another fluorine fraction from the wet process acid in the form of a soluble compound of aluminum and fluorine. The two forms of fluorine are then united in a solution containing sodium, potassium and ammonium which results in the precipitation of aluminum and fluorine from the final product. The final product may still remain high in magnesium levels, and thus may not be used without difficulty by the fertilizer industry.

U.S. Pat. No. 3,554,694 to Barker et al teaches a process for producing commercially pure sodium fluosilicate from wet process phosphoric acid by reacting a sodium salt, e.g., sodium chloride, with fluosilicic acid present in the wet process phosphoric acid and precipitating sodium fluosilicates. The magnesium level may still remain high in the end product, so sludge problems may still occur when using the end product in neutralization processes.

U.S. Pat. No. 3,562,769 to Sugahara et al teaches purifying wet process acid by adding one disintegration preventing agent selected from the group consisting of alkali metal salts and sulfuric acid to calcium phosphate or phosphate rock; and heating the resulting mixture to 100° to 300° C. to convert the impurities to perfectly solid, non-disintegratable small masses; and thereafter extracting the phosphoric acid component from the masses. While the end product might be substantially clean, this process is complicated and may be too expensive to operate.

U.S. Pat. No. 3,935,298 to Sugahara et al teaches a process of mixing pulverized phosphate rock with fluorosilic acid, i.e., $H_2SiF_6$, and then adding sulfuric acid to create a mixture which is then heat treated and shaped into non-disintegrating small masses. Further extraction of the small masses recovers phosphoric acid. $H_2SiF_6$, it is taught, is a disintegration preventing agent which prevents the dried phosphate rock/sulfuric acid reaction product from disintegrating when phosphoric acid is being extracted therefrom.

U.S. Pat. No. 4,435,372 to Frazier et al describes a complex method of removing aluminum, magnesium and fluoride impurities from wet process phosphoric acid with the calcium sulfate hemihydrate filter cake by hydrolyzing and recycling the off gas scrubber solutions in the presence of a ferric ion catalyst. The patent teaches that controlling the quantitative ratios of the impurity components in the presence of the catalytic agent, ferric ion, will cause precipitation of undesirable impurity compounds in the acid. Potassium additions can be made. This process is complicated and fraught with many steps.

U.S. Pat. No. 4,136,199 to Mills describes a method of removing metal ion impurities, such as magnesium and aluminum, from phosphoric acid with an impure sludge, which contains calcium fluoride and which is obtained by treating waste pond water with lime or limestone. In one embodiment, concentrated wet process phosphoric acid having a $P_2O_5$ content of 38 to 54 percent is mixed with a calcium fluoride-containing sludge and the resulting mixture is aged for five days following which it is centrifuged. The sludge introduces metallic ion impurities (col. 9, lines 1–3) and relatively high levels of aluminum or magnesium or both remain in the phosphoric acid product (Table 7). Overall the process is difficult to control because of varying compositions of the sludges used.

U.S. Pat. No. 4,299,804 to Parks et al teaches a process for precipitating impurities from unconcentrated acids, since, according to Parks et al, the high viscosity of concentrated wet process acid makes phase separation difficult and results in high capital expense for production equipment. The patent teaches that it is desirable to remove impurities in as large a quantity as possible, as early in the process as possible, without encountering processing problems. The patent teaches the addition to the filter grade wet process acid of a fluoride ion donating compound which may be hydrofluoric acid, sodium fluoride, sodium bifluoride, ammonium fluoride or ammonium bifluoride. $H_2SiF_6$, $Na_2SiF_6$ and $Na_3AlF_6$ are stated to have been tested as possible sources of fluoride ion, but, according to the patent, did not yield the preferred effects. The main thrust of this patent is that precipitation of the magnesium and aluminum impurities should occur before the acid is concentrated and that such precipitation can be controlled by using a fluoride ion donor. Silica in the acid is taught as inhibiting or preventing the aluminum ion from precipitating out of solution. The patent further teaches that it may be necessary to add alum or other aluminum ion donating compounds in order to obtain desired minimum fluoride ion to aluminum ion ratio and effective precipitations.

A very effective method of minimizing post precipitation in wet process phosphoric acids is to "stabilize" the acids via a series of process steps. One such method is taught in Astley et al, U.S. Pat. No. 4,487,750. This patent is incorporated in its entirety herein. The present application is intended to improve on the Astley et al process in those instances when it is desirable that a stabilized acid also contain reduced levels of aluminum and magnesium. The basic steps of the stabilization process of this patent are summarized as follows:

(1) Concentrating unclarified, dilute, wet process phosphoric acid having a weight ratio of $Fe_2O_3$ to $P_2O_5$ weight ratio substantially higher than 0.03 in a first evaporation zone until the $P_2O_5$ content of the solution is between 45 and 55%;

(2) Subjecting the concentrated acid solution to crystallization for at least 8 hours;
(3) Clarifying the crystallized acid solution by centrifugation until its total solids content is less than 2%;
(4) Concentrating said clarified acid solution in a second evaporation zone until the $P_2O_5$ content of said clarified acid solution is between 58% and 63%.

The above procedure produces a stabilized acid that contains a maximum of 2% total solids any time during the first 28 days of either or both storage and shipment. There is no need to add aluminum silicate, oxidizing agents or any other additives, it is taught, to produce the desired results, and, in most cases, no additional equipment need be purchased. Magnesium contamination is still somewhat high in the end product and thus when neutralized with ammonia, magnesium salts precipitate out of solution.

U.S. Pat. No. 3,642,439 describes a method of removing magnesium from wet process phosphoric acid via formation of a precipitate comprising a magnesium-aluminum-fluoride-phosphate complex compound. The process requires that the $SiO_2$ content be less than 0.2%, the F/MgO weight ratio be at least 2.2, and that the $Al_2O_3$/MgO weight ratio be at least 1.4. Aluminum and fluoride compounds must be added, if necessary, to maintain the ratios. A portion or all of the fluoride ion necessary to precipitate impurities may be obtained by decomposition, during evaporation, of $H_2SiF_6$ usually present in the unconcentrated wet process acid to HF and $SiF_4$ and the $SiF_4$ is boiled off leaving HF present in the concentrated acid. The patent teaching recognizes that HF or a soluble fluoride additive needs to be added to the concentrated acid to raise the fluorine ion level.

The patent teaches against the addition of fluosilicic acid, $H_2SiF_6$ to provide fluorine ions necessary for precipitate formation because, according to the patent, fluorine compounds, $SiF_4$ or $H_2SiF_6$, present in the acid are not effective to produce the desired magnesium complex. Addition of soluble fluorides capable of fluoride ion donation to the viscous concentrated acid, as taught by this patent, is not advantageous because the concentrated wet process phosphoric acid is supersaturated with impurities, is unstable, and therefore effective mixing of solubilized additives with the unstable acid requires extensive stirring and/or agitation of the precipitating solution. Moreover, if the concentrated acid is too concentrated, hydrogen fluoride will volatilize out of solution, it is taught.

Such a complicated precipitation step as is disclosed in the Moore et al patent is not necessary when sufficient fluoride may be added to the dilute solution at the beginning of the process as taught by the present invention. Moreover, the fluoride ion donating chemical does not have to be an expensive or caustic agent such as hydrofluoric acid. Furthermore, using seed crystals such as $MgAlF_5$ in the precipitation step and aligning fluoride ions present in the dilute solution to the proportion of fluoride in the seed crystals can significantly reduce precipitation times and still effectively reduce the magnesium, aluminum, and fluorine to negligible levels. Accordingly, post precipitation and metal contamination may be more advantageously reduced by the present invention in the production of wet process phosphoric acid.

None of the prior art patents mentioned above disclose or suggest the addition of fluosilicic acid to a dilute wet process phosphoric acid followed by concentration, as by evaporation, of the dilute acid to a $P_2O_5$ content of 45 to 55 wt. %, followed by crystallization of the magnesium and aluminum impurities, removal of the crystallized impurities, as by centrifugation, and final concentration, as by evaporation, of the acid to the desired $P_2O_5$ content, e.g., at least 56 wt. %.

While prior stabilization processes may produce acids with low post-precipitation characteristics, the same stabilized acids may still have excessive quantities of magnesium and aluminum contained in them. Conversely, the aluminum and magnesium content of a wet process acid might be significantly reduced and the acid might still exhibit excessive post-precipitation characteristics. Thus, a need exists in the industry to produce a wet process phosphoric acid that is stabilized with respect to post-precipitation and which also has reduced levels of aluminum and magnesium contained therein.

It is thus an object of this invention to provide a process for producing wet process phosphoric acid with low post-precipitation characteristics and containing significantly reduced levels of magnesium and aluminum compounds.

Another object of this invention is to provide a process for stabilizing wet process phosphoric acid which process produces an excellent quality acid with respect to post-precipitation characteristics and low magnesium and aluminum contents from high-iron acid feeds as well as from low iron acid feeds without aluminum silicate addition and without oxidation or any other such special treatment.

Another object of this invention is to provide an inexpensive process for producing wet process phosphoric acid stabilized with respect to post-precipitation and low in magnesium and aluminum impurities.

Still another object of this invention is to provide a wet process phosphoric acid with higher-than-normal $P_2O_5$ content in order that superior liquid fertilizers can be produced from the acid.

A still further object of this invention is to provide a process for stabilizing wet process phosphoric acid which process will not interfere with the simultaneous production of unstabilized normal merchant grade wet process phosphoric acid and unstabilized, merchant clarified wet process phosphoric acid.

These and other objects are accomplished by the process of our invention and will become apparent to those skilled in the art from the description that follows.

SUMMARY OF THE INVENTION

This invention is based on the discovery that fluosilicic acid added to dilute wet process phosphoric acid followed by concentration to 45 to 55 wt. % $P_2O_5$, crystallization of the magnesium and aluminum impurities as fluoride salts, removal of such impurities, and, if necessary, concentration of the acid to the final desired $P_2O_5$ content, e.g., at least 56 wt. %, results in a concentrated phosphoric acid having negligible amounts of magnesium and aluminum impurities and which is very stable against post-precipitation during subsequent shipment, storage and processing into other products, e.g., fertilizers.

More specifically, in this invention, the fluorine to magnesium oxide weight ratio of the raw dilute wet process phosphoric acid is adjusted to be in the range of 2.5:1 to 10.1:1, preferably 5:1, by the addition of fluosilicic acid.

In the process of our invention, the feed acid is an aqueous solution of dilute phosphoric acid having a concentration of 20 to 45 wt. % $P_2O_5$, preferably 25–35 wt. % $P_2O_5$ and having 1–8 wt. % total solids. The feed acid may be that obtained from a conventional wet process filtration system. Preferably, a dilute aqueous solution of fluosilicic acid, i.e., $H_2SiF_6$, of about 25 percent by weight is added in the appropriate amount to the feed acid and mixed therewith. Preferably the fluosilicic acid added to the feed acid is an aqueous solution having a concentration of 25 wt. % $H_2SiF_6$ so that a sufficient quantity is available to provide an F/MgO weight/weight ratio of 5:1. The ratio can be manipulated so that any ratio within the range of 2.5:1 and 10.1:1 is used. It is preferred, however, to maintain the ratio at about 5:1. The resulting mixture of the dilute acid and fluosilicic acid is then concentrated to a $P_2O_5$ content of 45 to 55 weight percent, e.g., by feeding the mixture to conventional wet process evaporators typically operating at 180°–190° F. and about 2 inches of mercury absolute pressure. The concentrated acid mixture is then passed to crystallizers where it is allowed to crystallize in the presence of $MgAlF_5$ seeds for at least 8 hours, preferably, at least 24 hours. $MgAlF_5$ seed crystals added to the concentrated acid mixture and precipitation is allowed to proceed for 8 to 40 hours. The crystallized concentrated acid mixture is then clarified by centrifugation or other clarification means and the product phosphoric acid obtained has a total solids content of less than 2wt. %. The product phosphoric acid may be further concentrated to a $P_2O_5$ content of at least 56 wt. %, preferably 56 to 63 weight percent. The resulting product acid has negligible amounts of magnesium and aluminum impurities and exhibits little, if any, post-precipitation during storage. Thus, a wet process phosphoric acid is provided which is very amenable to neutralization with ammonia to provide liquid fertilizers for food crops.

BRIEF DESCRIPTION OF THE DRAWINGS

The figure is a flow diagram of the preferred embodiment of the invention.

PREFERRED EMBODIMENT OF THE INVENTION

Referring to FIG. 1, the feed acid stream of the stabilization process is typically a dilute, wet process phosphoric acid aqueous solution of 25–35% $P_2O_5$ concentration and 1–8% total solids concentration. The acid is not clarified prior to entering the process of the present invention. Wet process phosphoric acid having low post-precipitation characteristics and reduced levels of magnesium and aluminum is produced, according to one embodiment of the invention, by digesting phosphate rock with sulfuric acid to form phosphoric acid (i.e., orthophosphoric acid or wet process phosphoric acid), gypsum, i.e., $CaSO_4.2H_2O$, and numerous other suspended and dissolved impurities. The produced slurry is filtered to remove solid impurities, of which gypsum is the major constituent. The resulting filtrate is the feed solution in the preferred embodiment of the present invention. The typical components of a suitable feed solution are set forth in Table 1. It should be noted that phosphate rock, like many naturally occurring substances, will vary in composition so the values given in Table 1 are illustrative and not restrictive and therefore subject to change depending upon the makeup of the rock. It should be further noted that unless otherwise indicated, all percentage figures in the specification are on a weight basis.

TABLE 1

| Typical Unclarified Dilute Wet Process Acid | |
| --- | --- |
| Component | Range % |
| $P_2O_5$ | 25–35 |
| $Fe_2O_3$ | 1.1–1.9 |
| $Al_2O_3$ | 0.8–1.6 |
| MgO | 0.4–0.7 |
| F | 1.5–4.0 |
| $SO_4$ | 1.0–3.5 |
| Carbon | 0.1–0.2 |
| Solids | 1–8 |

After removal of the gypsum, the phosphoric acid feed solution is assayed to determine the fluorine to magnesium oxide weight ratio, i.e., F/MgO, present in the solution. The weight ratio should be adjusted to be in the range of about 2.5:1 to about 10.1:1 and preferably 5:1. This is a crucial step in assuring reduced levels of magnesium and aluminum in the final product. An F/MgO ratio outside of the above enumerated range will inhibit subsequent purification steps.

All too often the F/MgO is below 2.5, especially if the feed solution is augmented by a recycled product solution obtained upstream in the wet process or the phosphate rock is low in calcium fluoride. An excess of fluorine provided by fluosilicic acid is necessary to cause precipitation of the magnesium and aluminum out of solution.

In accordance with this invention, a solution having an $H_2SiF_6$ content of about 25 percent is added to the feed solution through line 2 to adjust the F/MgO weight ratio close to the preferred 5:1 ratio. Although ratios as low as 2.5:1 and as high as 10.1:1 will result in adequate removal of magnesium and aluminum, optimum removal will result with a ratio of 5:1. Aligning ratios in the feed solution with the ratio in the seed crystals (which in the preferred case is $MgAlF_5$), affords maximum removal of magnesium and aluminum. $H_2SiF_6$ may be added as a concentrate, but this is neither necessary nor economically desirable. It is preferred that a dilute solution of about 25 percent be used.

Once the F/MgO ratio has been adjusted with the $H_2SiF_6$, the resulting phosphoric acid-fluosilicic acid mixture is transferred via line 3 to evaporation train 4 where it is concentrated to a $P_2O_5$ content of about 45 percent to about 55 percent. Many methods for concentrating are known and any suitable method may be used. However, it has been found that evaporation at low pressure with conventional steam heated multiple stage evaporators provides superior results. Single stage evaporators may be used without significant problems. Evaporation is carried out at about 180° F. (82° C.) to about 190° F. (88° C.) and at an absolute pressure of 2 inches of mercury (51 torrs). Higher temperature evaporations may be achieved if the evaporation machinery is equipped with high temperature resistant linings.

The concentrated solution, at this point, is equivalent in quality to some merchant grade acids and would have levels of post-precipitations as high as 8.0 percent total solids after about 28 days. Optionally, the invention provides for an intercentrifugation step within the evaporation step. Once the unclarified solution has reached a $P_2O_5$ level of about 40 percent to about 42 percent, the solution may be centrifuged by using, preferably, solid bowl centrifuges which are well known in the industry. Other centrifuges may be used, but solid bowl centrifuges are well suited for handling relatively coarse solids existing in the solution at this point. Once coarse solids have been removed, the solution is returned to the evaporator 4 to be further concentrated to a $P_2O_5$ level of about 45 percent to about 55 percent.

The concentrated, still contaminated acid mixture is next transferred via line 5 to a crystallization tank 6 where seed crystals, e.g., $MgAlF_5$, are added via line 7 and precipitates of a complex Mg, Al, F compound are allowed to form. Preferably, crystallization of the impurities takes place in a tank 6 equipped with a recycling assembly such that seed crystals may be recaptured at the bottom of the tank 6 and added back into the top of the tank 6. The recycling assembly may be a tank underflow solids recirculation conduit 8 together with the necessary valves, pumps, filters, etc., all of which are known in the industry.

The preferred seed crystals are $MgAlF_5$ and may be added to the crystallization tank 6 by any suitable method. Only a small amount is needed to initiate precipitate formation but more may be added to accelerate crystallization. Other seed crystals may be used but the F/MgO weight ratio in the feed solution to the crystalizer preferably should be aligned with or approximate the F/Mg ratio in the crystals. $MgAlF_5$ is preferred and is well suited to the present process. Optionally, solids recycled via line 9 from the subsequent clarification step, e.g., the centrifugation step can also be used, in place of or in addition to the $MgAlF_5$ seed crystals, to effect crystallization in the crystallization tank 6.

If the present process is adapted for a batch operation, crystallization should be allowed to proceed for about 8 to 72 hours, preferably at least 24 hours. Sufficient precipitation will occur in 8 hours if the system is finely tuned such that the F/MgO ratio of the feed acid is adjusted to 5:1, sufficient amounts of $MgAlF_5$ seed crystals are added to peak precipitation rates, and underflow solids in the crystallization zone 6 are recycled back into the overflow or top of the crystallization zone. If the present process is adapted for a continuous operation, then crystallization should be allowed to proceed for about 16 to about 48 hours. The crystallization zone may consist of product storage tanks or other storage vessels which may or may not be agitated.

Ideally, the crystallization step is carried out at about 140° F. (60° C.) to about 160° F. (71° C.) which is the normal acid storage temperature. Cooling may be employed to accelerate precipitation. It should be noted that the crystallization step may be carried out at the temperature of the solution leaving the evaporators, however, more time should be allowed for precipitate formation. In addition to the complex Mg-Al-F compound, other solids are also crystallized at this point. The total dissolved solids contained in the acid is significantly reduced in this crystallization step. The crystallization tank should be equipped with an underflow recirculation line which returns tank underflow solids to the upper level of the crystallization tank.

After precipitation in the crystallization tank 6 has proceeded to a satisfactory degree, the resulting phosphoric acid solution is then clarified. Passive clarification is lengthy so centrifugation is preferred. The resulting phosphoric acid solution is passed through line 10 from crystallization tank 6 to centrifuges 11. Centrifugation is accomplished by using any of a number of commercially available centrifuges. It is conceivable that methods other than centrifuging can be used for clarifying, e.g., extensive long period settling; however, it is preferred to use typical centrifuges of the nozzle centrifuge type or solid bowl centrifuges. After centrifugation, a clarified acid is obtained in the upper layers and a concentrate of high solids is obtained in lower layers. Solids disposal from the clarification step may be accomplished by passing the solids or lower layers to a conventional high solids acid storage system or back to the acid attack system through line 12 or back to the crystallization tank 6 via line 9. Centrifuging reduces the total solids in the clarified acid to less than 2 percent. Once the concentrated phosphoric acid solution is clarified to less than 2 percent total solids, the solution is discharged through line 13 to a second evaporation zone 14 where it is further concentrated to a $P_2O_5$ content of 56–63% by weight under the same conditions and with the same type of equipment as discussed hereinabove in connection with the first evaporation zone 4. The resulting stabilized phosphoric acid, containing significantly reduced levels of aluminum and magnesium, is ready for shipment and is transferred by line 15 to storage or shipping facilities. The stabilized acid will contain a maximum of not more than 2% total solids at any time during the first 28 days of either or both storage and shipment.

It is to be understood that intermediate phosphoric acid products of the present process may be marketed as such. For instance, a portion of the unclarified concentrated solution may be separated and marketed as a merchant grade acid having a $P_2O_5$ content of between 45 percent and 55 percent. Additionally, a portion of the clarified concentrated acid having a $P_2O_5$ content of about 45 percent to about 55 percent by weight may be separated and marketed. The end product being clarified and concentrated to a $P_2O_5$ content of 56 percent to about 63 percent is the preferred product to be used in ammonia neutralization processes for making fertilizer.

The concentrated clarified end product may be mixed with water and ammonia at controlled ratios to give an aqueous ammonium phosphate fertilizer solution analyzing 10 to 11 percent nitrogen and 34 to 37 percent $P_2O_5$. This ammonium phosphate solution may be cooled to about 30° C. and stored. It should remain stable without appreciable precipitation of solids for months. The aluminum and magnesium content of the acid produced by the process of the present invention is lower than the aluminum and magnesium content of the acid produced by prior art processes. The stabilization of the product acid produced by this invention occurs at a lower $P_2O_5$ concentration, (at 56 wt. % $P_2O_5$ or higher), than the acid of the afore-mentioned Astley et al process, (58 percent or higher, Astley et al U.S. Pat. No. 4,487,750). The stabilization at a lower $P_2O_5$ concentration is a distinct advantage since the need to use expensive evaporator capacity is reduced in those instances when a higher percent $P_2O_5$ content in the acid is not necessary.

The second concentration step of the present invention is an essential step in producing a truly stabilized phosphoric acid of high quality. It has been found that it is necessary to evaporate the acid to a minimum $P_2O_5$ concentration of 56 percent to achieve long lasting stabilization. By doing so, the acid thus made will contain less than 2 percent solids after 28 days period of storage or shipment. Qualitatively, the stabilized product will be characterized by negligible formation of sludge in equipment handling such acid. Normal unstabilized merchant grade phosphoric acid would, over 28 days post precipitate to such an extent that the solids content of the acid would exceed 5 percent. This can result in over 5,000 lbs. of sludge being formed in a 100 ton rail car. Thus the equipment handling such acid would require expensive cleaning. Additionally, there are additional freight costs associated with transporting the sludge which is virtually useless. The improved reduced post precipitation characteristics of the acid produced by the process of the present invention results in substantial savings associated with the shipping of wet process acid. It utilizes a very inexpensive and readily available source of fluorine, namely, fluosilicic acid, and provides a high grade product having more value and saleability than heretofore known procedures. Moreover, when the end product is used in the making of fertilizer, magnesium sludge formation is avoided.

The following examples will illustrate the present process, but are not intended to limit the scope of the invention. Examples 1 and 2 simulate in part the stabilization process as shown in the figure. These examples were performed using a common feed acid with the composition shown in Table 1.

EXAMPLE 1

A two-gallon stainless steel cylindrical vessel was used to carry out evaporation operations. Two kilograms of wet process phosphoric acid of 30 weight percent $P_2O_5$ content was added to the vessel along with 176 grams of 25.5 percent aqueous solution of $H_2SiF_6$. The magnesium concentration of the phosphoric acid-fluosilicic acid solution was analyzed at this point and found to be 0.22 percent by weight. The aluminum concentration was 0.57 percent by weight.

Heat was then applied to the test vessel by silicone heating tapes. The phosphoric acid-fluosilicic acid solution temperature was raised to about 190° F. at 2 inches of mercury absolute pressure. The evaporation operation continued until the $P_2O_5$ content reached 48.2 wt. %.

The phosphoric acid-fluosilicic acid solution was then placed in a stainless steel crystallizing vessel. A small quantity of $MgAlF_5$ seed crystals was added to the vessel and the solution was maintained at 140° F. for 48 hours by use of constant temperature water bath. A small stirrer operating at 125 rpm was used to stir the solution. The solids content of the solution reached 6.2 percent at the end of the crystallization step.

A tube centrifuge was then used to reduce the solids content to 1.5 percent. The solution was then placed back in the evaporator and the solution was reevaporated at 2" Hg absolute pressure and 185° F. until the $P_2O_5$ concentration reached 56.1%. The magnesium and aluminum concentrations at this point were 0.18% and 0.54%, respectively. These new magnesium and aluminum concentrations show significant reductions over the concentrations measured earlier in the process. The solution was then stored at ambient temperature for one month. Samples were taken and analyzed for % solids at the end of one week storage and one month storage. The results of the analyses are shown in Table 2:

TABLE 2

| Storage Time | % Solids |
|---|---|
| one week | 1.76 |
| one month | 1.95 |

These results show that the phosphoric acid solution was stable with respect to post precipitation as well as low in magnesium and aluminum content.

EXAMPLE 2

This procedure was carried out using the same equipment and protocol of Example 1; however, the total quantity of chemical reagents used was one-half that used in Example 1.

Eighty-eight grams of 25.5 percent $H_2SiF_6$ were added to one kilogram of phosphoric acid having a 30 percent $P_2O_5$ content. The solution was evaporated to a $P_2O_5$ concentration of 48.8 percent. The magnesium and aluminum concentration at this point were 0.66 percent and 1.36 percent, respectively.

The solution was then crystallized in the presence of $MgAlF_5$ seed crystals for 24 hours. The solids concentration reached 5.4 percent at the end of the crystallization step.

The solution was then centrifuged until the solids content reached <0.1%. The solution was placed back in the evaporator and evaporated until the $P_2O_5$ concentration reached 56.8 percent. The magnesium content at this point, i.e., 0.15 percent, and the aluminum content, i.e., 0.84 percent, show significant reductions in the concentration of these two elements using the inventive process.

Samples were taken and analyzed for percent solids at various storage intervals up to one month. The results are shown in Table 3:

TABLE 3

| Storage Time | Solids % |
|---|---|
| one week | 0.38 |
| two weeks | 0.32 |
| one month | 1.38 |

The results of Example 2 show the product to be stabilized with respect to post precipitation even though the crystallization step of Example 2 was carried out for only one-half the time of the crystallization step of Example 1.

The product acids of both examples are clearly stabilized with respect to post-precipitate formation and contain significantly reduced levels of magnesium and aluminum.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as their conjointly cooperative equivalents are therefore intended to be embraced by those claims.

What is claimed is:

1. A method for producing wet process phosphoric acid with low post-precipitation characteristics and reduced aluminum and magnesium levels from an unclarified dilute wet process phosphoric acid containing aluminum and magnesium impurities and having a fluorine to magnesium oxide weight ratio of less than about 2.5:1, comprising the steps of:
   (a) mixing fluosilicic acid with said unclarified dilute wet process phosphoric acid in an amount sufficient to provide a fluorine to magnesium oxide weight ratio of about 2.5:1.0 to about 10.1:1.0 to form a mixture thereof;

(b) concentrating said mixture to a $P_2O_5$ content of about 45 to about 55 percent by weight;

(c) subjecting the resulting concentrated mixture to crystallizing conditions for at least 8 hours whereby impurities are crystallized;

(d) clarifying the resulting concentrated mixture containing crystallized impurities until the total solids are reduced to less than about 2 percent by weight; and (e) concentrating the resulting clarified wet process phosphoric acid to a $P_2O_5$ content of about 56 percent to about 63 percent by weight to provide a phosphoric acid product having low post-precipitation characteristics and reduced magnesium and aluminum levels.

2. The method of claim 1 wherein the F/MgO ratio of the dilute wet process phosphoric acid is adjusted to about 5:1 with fluosilicic acid.

3. The method of claim 2 where the step of crystallizing further comprises the step of adding $MgAlF_5$ seed crystals to said concentrated mixture.

4. The method of claim 3 where the step of crystallizing further comprises the step of adding precipitated impurities obtained from said crystallizing step to said concentrated mixture resulting from step (b).

5. The method of claim 4 wherein said unclarified acid solution has a total solids content of about 1 percent to about 8 percent.

6. The method of claim 5 wherein said total solids content is substantially higher than 2 percent.

7. The method of claim 1 wherein the step of crystallizing is carried out batch wise for less than 24 hours.

8. The method of claim 1 wherein the crystallizing step is carried out in a continuous mode for at least 16 hours.

9. The method of claim 7 wherein step (b) is carried out by evaporating the mixture of phosphoric and fluosilicic acids in a first evaporation zone, and wherein step (e) is carried out by evaporating the clarified wet process phosphoric acid in a second evaporation zone.

10. The method of claim 9 further comprising the step of centrifuging said unclarified solution undergoing concentration in a first evaporation zone when the $P_2O_5$ content of the solution is from about 40 percent to about 42 percent by weight and returning the solids resulting from centrifugation to said first evaporation zone.

11. The method of claim 10 wherein the steps of evaporating are carried out at a temperature from about 180° F. (82° C.) to about 190° F. (88° C.) and at an absolute pressure of about 2 inches of mercury (51 torrs).

12. The method of claim 11 wherein the evaporating steps are carried out using conventional steam heated multiple-stage evaporators.

13. The method of claim 11 wherein the steps of evaporating are carried out using single stage evaporating.

14. The method of claim 12 wherein the crystallizing steps are carried out using a crystallization tank equipped with underflow solids recycling means, whereby precipitates are added back into the crystallizing step to further aid precipitate formation.

15. The method in claim 14 wherein step (a) is carried out by adding an aqueous solution having an $H_2SiF_6$ content of about 25 percent.

16. A method of producing wet process phosphoric acid with low post-precipitation characteristics and reduced aluminum and magnesium levels from an unclarified dilute wet process phosphoric acid solution having a fluorine to magnesium oxide weight ratio of less than 2.5:1, comprising the steps of:

(a) mixing fluosilicic acid with said phosphoric acid solution in an amount to provide a F/MgO ratio in said acid solution of about 2.5:1.0 to about 10.1:1.0;

(b) concentrating said mixture to a $P_2O_5$ content of about 40 percent to about 42 percent by weight by evaporation within a first evaporation zone using steam heated multiple-stage evaporators at a temperature of about 180° F. (82° C.) to about 190° F. (88° C.) and at an absolute pressure of about 2 inches of mercury (51 torrs);

(c) centrifuging said concentrated unclarified acid to reduce total solids;

(d) further concentrating the resulting solution after centrifugation in the first evaporation zone to a $P_2O_5$ content of about 45 percent to about 55 percent by weight;

(e) crystallizing the concentrated solution for at least 8 hours in the presence of $MgAlF_5$ seed crystals in a crystallization tank equipped with means for recycling seed crystals to the crystallizing steps;

(f) clarifying the solution resulting from crystallization by centrifugation until total solids are reduced to less than 2 percent; and (g) concentrating the resulting clarified acid to a $P_2O_5$ content of about 56 percent to about 63 percent by evaporation in a second evaporation zone using steam heated multiple-stage evaporators operating at a temperature from about 180° F. (82° C.) to about 190° F. (88° C.) and at an absolute pressure of about 2 inches of mercury (51 torrs) to provide a wet process phosphoric acid product having low post-precipitation characteristics and reduced levels of aluminum and magnesium.

17. The method of claim 16 wherein step (a) is carried out by adding a solution having an $H_2SiF_6$ content of about 25 percent by weight.

18. The method of claim 16 wherein step (a) is carried out by providing a F/MgO ratio of about 5:1.

19. A method for simultaneously manufacturing merchant grade wet process phosphoric acid, clarified merchant wet process phosphoric acid and stabilized wet process phosphoric acid from unclarified dilute wet process phosphoric acid containing 20 to 45 wt. % $P_2O_5$, comprising steps of:

(a) mixing fluosilicic acid with said phosphoric acid solution in an amount to provide a F/MgO ratio of about 2.5:1 to about 10.1:1 in an unclarified dilute wet process phosphoric acid solution to $P_2O_5$ weight ratio substantially higher;

(b) concentrating the resulting mixture by evaporation in a first evaporation zone to a $P_2O_5$ content of about 45 percent to about 55 percent by weight;

(c) separating a first fraction of the concentrated unclarified solution to provide a merchant grade phosphoric acid having a solids content of about 3 percent to about 15 percent;

(d) crystallizing a second fraction of the concentrated unclarified solution for at least 8 hours in the presence of seed crystals;

(e) clarifying the solution resulting from crystallization by centrifugation to a total solids content of less than 2 percent by weight;

(f) separating a first fraction of the clarified solution to provide a clarified merchant wet process phosphoric acid having reduced levels of magnesium and aluminum; and (g) concentrating a second fraction of the clarified solution in a second evaporation zone to a $P_2O_5$ content of about 56 percent to about 63 percent to provide a stabilized wet process phosphoric acid with low post-precipitation characteristics and reduced levels of magnesium and aluminum.

20. Method of claim 19 wherein step (a) is carried out by providing a F/MgO ratio of about 5:1 by adding a solution with an $H_2SiF_6$ content of about 25 percent by weight, and wherein the step of crystallizing is carried out in the presence of $MgAlF_5$ seed crystals.

* * * * *